Jan. 1, 1935.  E. G. BAILEY  1,986,663
FURNACE
Original Filed March 17, 1928  3 Sheets-Sheet 1
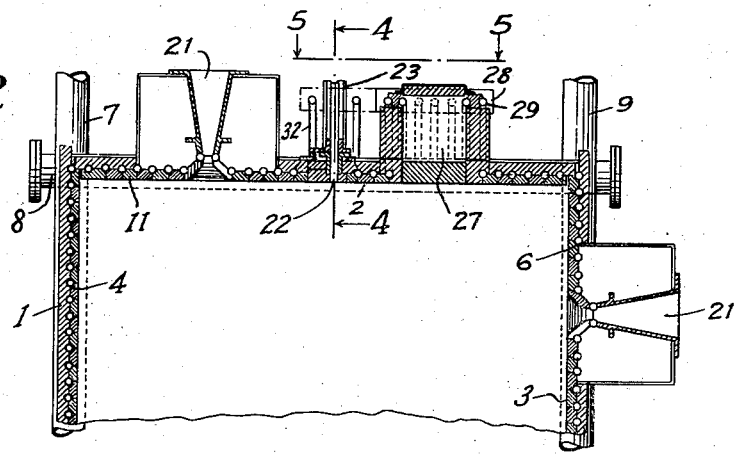
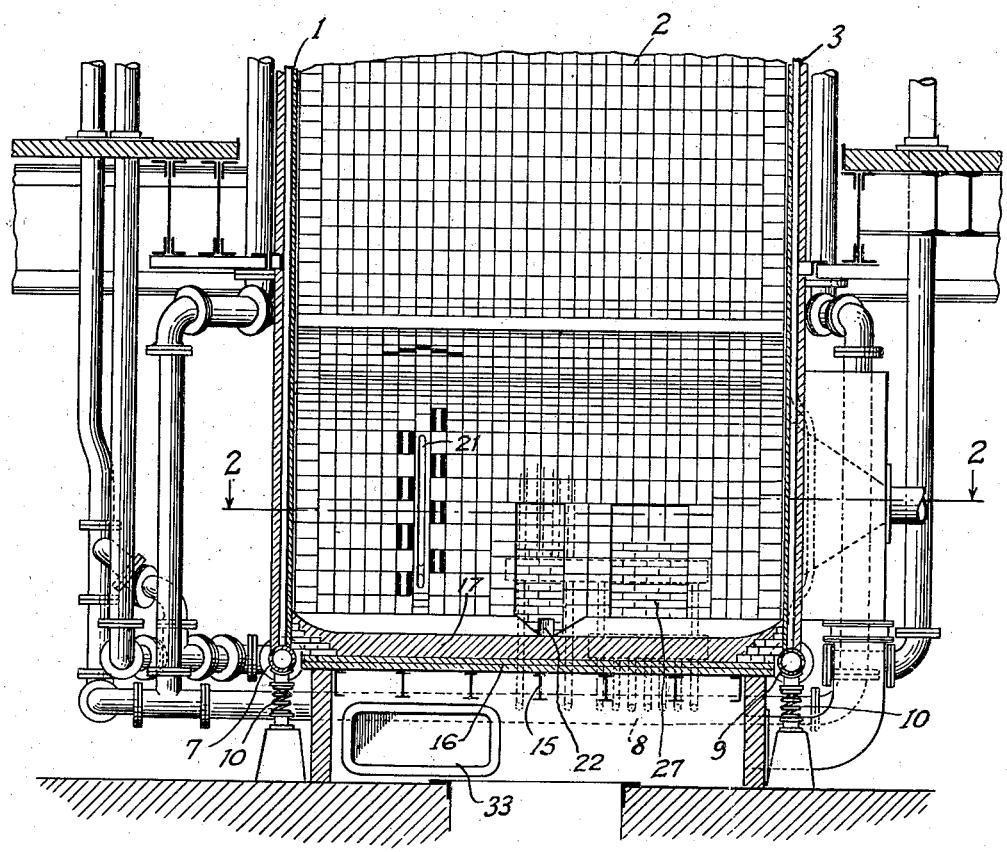
INVENTOR
Ervin G. Bailey
BY
ATTORNEY

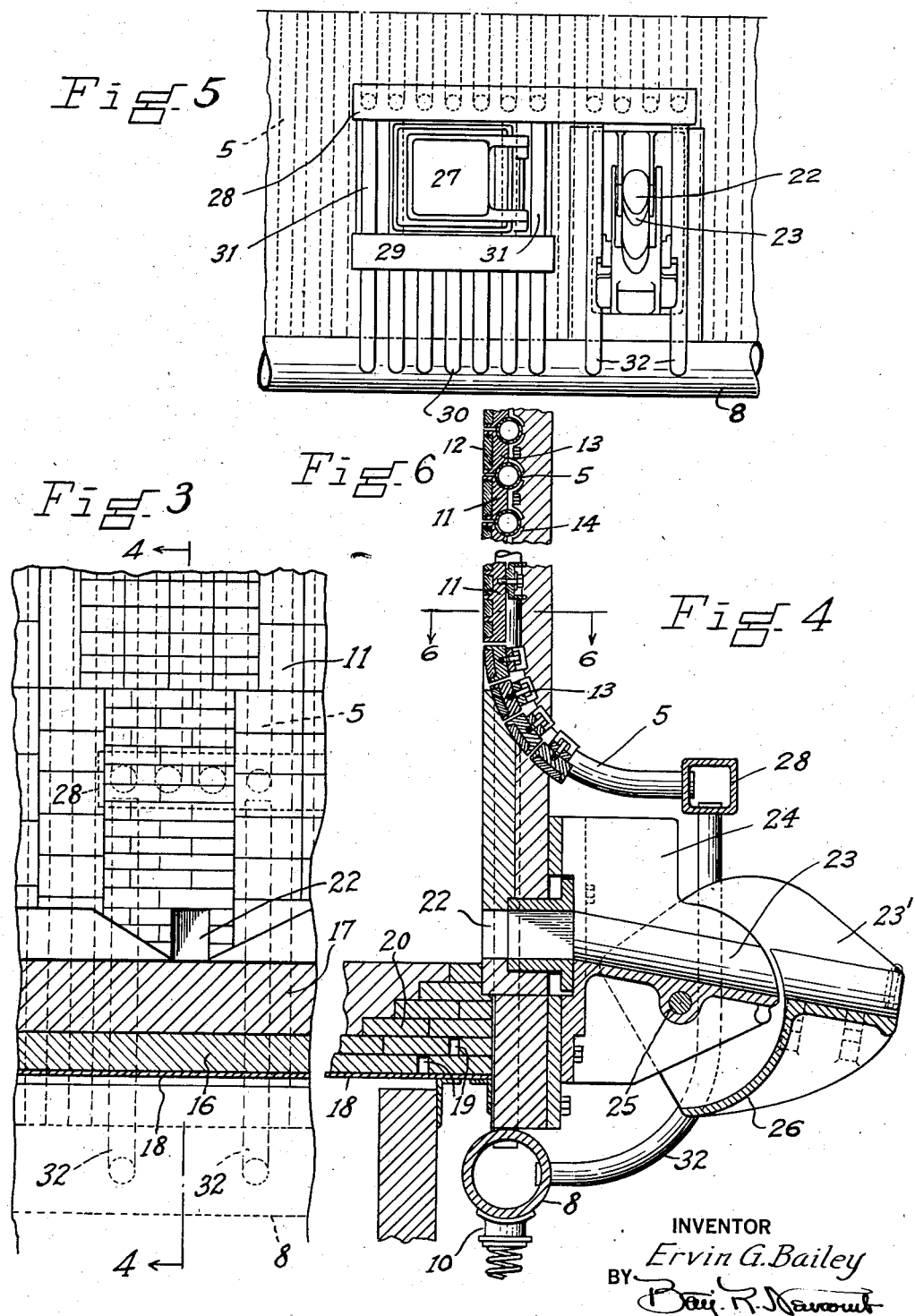

Jan. 1, 1935. E. G. BAILEY 1,986,663
FURNACE
Original Filed March 17, 1928 3 Sheets-Sheet 3

INVENTOR
Ervin G. Bailey
BY
ATTORNEY

Patented Jan. 1, 1935

1,986,663

UNITED STATES PATENT OFFICE 1,986,663

FURNACE

Ervin G. Bailey, Easton, Pa., assignor to Fuller Lehigh Company, New York, N. Y., a corporation of Delaware Original application March 17, 1928, Serial No. 262,363. Divided and this application October 7, 1932, Serial No. 636,700

5 Claims. (Cl. 122—235)

This application forms a division of my copending parent application, Serial No. 262,363, filed March 17, 1928, and is intended to cover the process or method of operating a boiler furnace employing slag-forming fuel such as pulverized coal as therein set forth.

This part of the invention relates to an improvement in methods of operating that type of boiler furnace in which a slag-forming fuel is burned. With fuel such as pulverized coal, which in burning forms slag, trouble has been experienced in disposing of the slag which is deposited in the bottom of the furnace directly from the burning fuel, or else gathers on the walls of the furnace and runs down toward the floor or both.

In the practical art of pulverized coal furnaces, water cooling of the side walls has been used, with or without refractory linings, in order to protect such walls from the damaging effect of the molten ash usually termed slag.

In addition to the problem of properly protecting the walls, there has been the problem of removing the ash or slag collecting in the bottom. Slag screens in the form of separated transverse water tubes above the furnace bottom have been commercially used to chill the slag particles as they descend and thus enable the cooled granular ash or slag to be removed in dry form.

The water cooling of the side walls especially in connection with the transverse water tubes above the floor or the water tubes in the floor, all contributed toward chilling the slag particles so that the slag was removed in dry granular form. The basic principle there involved was chilling or freezing the slag.

As set forth in my parent application above recited, I water cool the side walls and also fluid cool the bottom; but instead of freezing the molten slag into granules, I maintain over and covering the bottom or floor a lake or pool of molten slag which is of decreasing temperature from its upper surface downward to the furnace floor. Should the slag be tapped intermittently, the level of such pool changes; it rises between tappings and is intermittently lowered when tapped. It may be entirely or partially withdrawn at the end of a tapping period but is maintained and gradually increases in depth between tappings.

To maintain the liquid condition of the slag in the pool on and over the floor, a layer of heat resistant material is interposed between the slag and the fluid cooled metallic parts of the floor, such upper floor layer being of suitable thickness and of such heat conductivity as to maintain the required temperature differential between the lower fluid cooled metallic part of the floor and the upper face which supports the liquid slag. This layer may be of any suitable heat resistant material selected for the purpose. The floor is fluid cooled to a degree sufficient to protect the same from the destructive action of the molten slag, but insufficient to prevent the formation and maintenance of a quiescent pool of molten slag.

As a second means of maintaining the liquid condition of the slag in the pool, the flame of the burning fuel is directed close to or in direct contact with this pool. By either or both of these means, slag in the pool is maintained molten under all working conditions of furnace loads, while at the same time fluid cooling of the metallic floor parts prevents damage to them.

In the accompanying drawings, in which I have shown one embodiment of the invention—

Fig. 1 is a vertical sectional view through the lower part of a furnace, constructed according to my invention;

Fig. 2 is a fragmentary section taken on the line 2—2 of Fig. 1;

Fig. 3 is a fragmentary elevation on an enlarged scale, and showing the interior of the furnace wall at the slag tapping opening;

Fig. 4 is a sectional view through the slag tapping opening, being taken on the lines 4—4 of Figs. 2 and 3;

Fig. 5 is a fragmentary elevation of the outer face of the furnace wall at the slag tapping and access openings, and taken on the line 5—5 of Fig. 2;

Fig. 6 is a section on the line 6—6 of Fig. 4; and

Figure 7:
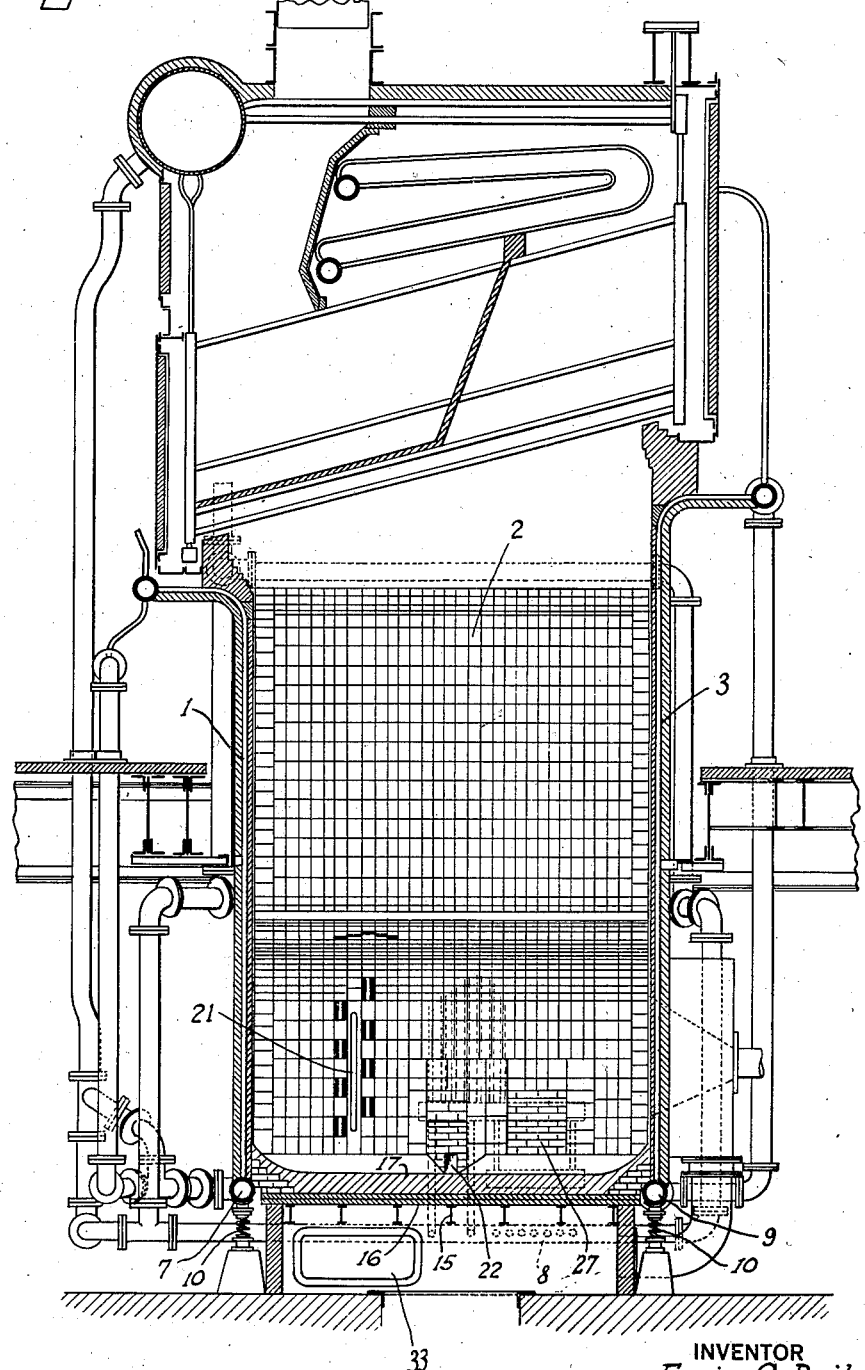
Fig. 7 is a sectional elevation illustrating the furnace shown in Figs. 1 to 6 inclusive as incorporated in a steam generator.

For the purposes of illustration, I have shown my invention as applied to a furnace having substantially vertical walls, of which are shown three, 1, 2 and 3, each of which is formed by vertically extending water tubes 4, 5 and 6, respectively, connected at their lower ends to headers 7, 8 and 9, to which tubes an appropriate covering may be applied. The upper ends of the water tubes are connected to the usual upper headers (see Fig. 7). Normally water is admitted to each lower header and rises through the tubes in the wall where some steam will be formed. Steam and water are discharged from the upper header. Such furnace walls would normally form part of a steam boiler and as such are termed water walls. It will be noted that every side wall is water cooled.

It will be noted that each of the lower headers is independent of the others, whereby each wall may expand and contract in a vertical direction independently of the others, and the lower headers are preferably carried on spring supports 10. The covering for the wall tubes may comprise individual tile or blocks 11, which are best shown in Figs. 4 and 6, these blocks being formed with refractory faces 12 and metallic backings 13 which are in close engagement with the tubes, where they are held by suitable clamps 14. The details of the blocks and clamping means have been omitted from Fig. 2, for the sake of clearness, and because of the small scale of this figure.

The floor of the furnace is supported upon suitable steel beams 15 and sometimes comprises a single course of brick 16, although in the illustrated embodiment two courses are shown. Upon the upper course is preferably placed a layer of dolomite 17, and the course of brick is preferably laid loosely on the supporting metallic plates 18 disposed on the beams 15.

Adjacent the edges of the floor, the plates 18 upon which the brick work is supported, extend substantially into contact with the side walls, as best shown in Fig. 4. The brick work course 16 is provided with expansion joints 19, which are covered by a plurality of courses 20 extending along the walls.

In one or more of the side walls is disposed a burner indicated generally at 21, and which is preferably adapted to burn pulverized coal. The burner should preferably be one which will give great turbulence to the incoming fuel, and it will be noted that the burner is so arranged as to project a flame horizontally and relatively close to the floor.

In the embodiment shown, I contemplate placing a burner in each wall substantially in the position shown, so that the flames therefrom will intersect within the furnace and in such a way as to cause still greater turbulence than is present in the individual streams of fuel, thus providing thorough mixture of the air and fuel, and complete combustion of the fuel.

The burning fuel will form slag, as is well known in the art, and the major part of this slag will find its way to the floor of the furnace. Instead of making efforts to cool the slag and cause it to form a relatively fine ash, as has been done in the past, I accumulate slag on the floor in the form of a quiescent pool of molten slag, and tap this slag at will at suitable intervals.

The slag is kept in its molten state by the proximity of the streams of burning fuel which, as noted above, are relatively close to the floor, and therefore maintain the temperature of the slag on the floor sufficiently high, to keep it in its molten state. This action is promoted by the layer of heat-resisting material overlying the metallic bottom of the floor and separating it from the molten slag pool.

The slag is preferably tapped at intervals through a suitable opening such as indicated at 22 and from which it runs down a spout 23. In the form shown, this is formed of two sections, one supported between the ears 24 and the other pivoted at 25 upon such ears 24, and being provided with an apron 26 which, when the outer section 23' is lifted, will close the inner section of the spout. By the intermittent tapping, a vigorous flow of slag is insured such as will prevent closing of the hole by the freezing of the slag that might occur with a feeble flow, as in a continuous discharge. Between tapping periods the level of the pool on the furnace floor rises and for practically all the time the floor is covered with slag; the only exception being at the end of a tapping period when and if tapping is carried to the limit.

The tapped slag may be permitted to run into a sluiceway, where it may be subjected to jets of water or it may be tapped directly into a stream of water or otherwise disposed of. The starting and stopping of the slag flow may be carried out in any desirable manner as by plugging or unplugging the tap hole.

Adjacent the tap hole, I preferably provide an access door indicated at 27. Normally, this door is bricked up as shown in Figs. 1 and 2, the brick being removed when it is desired to enter the furnace through the door.

Disposed in front of the two openings formed by the door and the tap hole, and spaced from the wall of the furnace, is a transversely extending header box 28. This box preferably extends beyond both openings and is connected to the wall tubes above these openings, these tubes being bent outwardly as best shown in Fig. 4, and expanded into the box.

Disposed beneath the door 27 is a second transversely extending header box 29, connected by nipples 30 to the header 8. The boxes 28 and 29 are connected by nipples 31 disposed on opposite sides of the door 27. Disposed on opposite sides of the tap hole are two nipples 32, which connect the header 8 to the box 28.

By the above arrangement, a convenient disposition of the access door is provided, and proper circulation of water past both the access door and tap hole is also obtained. At the same time, the tubes are disposed far enough from the tap hole to prevent their chilling the slag and thus preventing or hindering its flow.

A cooling fluid is introduced under the floor to contact with the metallic bottom parts thereof. As shown, this cooling fluid is air entering the chamber below the furnace bottom through the central opening in the foundation shown in Fig. 1 (not numbered). This air cools the metal bottom parts and thence flows sidewise into conduits 33 which supply air to the powdered fuel burners. The heat abstracted from the floor is thus utilized.

In operation, the furnace is started and as the slag accumulates on the floor, it is maintained in a molten condition by the intense heat of the flame which is relatively close to the floor, and by the heat resistant layer between the fluid-cooled metal parts of the floor and the overlying slag pool.

As the slag accumulates and reaches a point sufficiently high above the tap hole it is tapped lower at desirable intervals. In practice these intervals may be once or twice a day under normal loading, and under light loading the period may extend to several days between tappings. If it is intended to use the slag for manufacturing purposes, as an ingredient in a composition of matter for which it may be suitable, any desirable material may be added to the pool of slag before tapping. For example, limestone or feldspar are substances which may be added, although of course I do not intend to limit myself to such substances alone. Such material may be introduced through the observation doors, not shown.

The sliding expansion joints between the floor and the side walls and between the side walls themselves in the corners, allow relative expansion and contraction without causing leakage openings to form, or injury to the furnace parts.

The heat from the pool of molten slag will aid materially in maintaining a high furnace temperature by radiation, and the heat is partly carried to the wall tubes by means of the heat conducting tile supported thereon, the tubes maintaining the walls cool so that the high temperature generated by the burning gases, assisted by the radiation from the slag pool, does not destroy them. The walls are preferably made of the heat conducting tile indicated in Fig. 4, except at the two openings, where a magnesite or other suitable brick may be employed instead of tile. Such brick are easily replaceable when burned out. By this means, a high furnace temperature may be maintained without damage to the walls or the floor, the heat passing through the tile which are of high conductivity, and thence into the water circulating in the wall tubes and into the fluid beneath the floor and in contact with the metallic parts of the floor.

In the construction described, the slag from the side walls flows onto the furnace floor, where it joins the slag deposited directly on the floor from the combustion space to form a molten mass. The joints between the sides of the floor and the side walls are kept tight enough to insure that the slag will not leak through. By carrying the water tubes well below the top of the floor, protection of all parts of the wall which may be contacted with fluid slag is insured.

One of the principal features of my improved method is the degree to which the side walls and floor of the furnace are cooled. As stated, I provide for the positive fluid cooling of the side walls and floor to a degree sufficient to adequately protect the walls and floor from the destructive action of molten slag; but not to such a degree as would prevent the formation and maintenance of the pool of molten slag on the floor. In the preferred embodiment which I have disclosed, I provide this cooling by the circulation of water through the tubes in the side walls and by the circulation of air through the chamber beneath the floor. My invention, however, in its broader aspects is not limited to this particular means of cooling, for other means and other fluids may be provided for cooling without departing from the intended scope thereof. In this connection it may be observed that I have paid particular attention to the cooling of at least those portions of the side wall which form the boundary portions of the molten pool of slag so as to insure adequate protection of the furnace from the destructive action of the molten slag.

The present invention has many commercial advantages in respect to installations where slag is frozen. It affords a method of efficiently burning a wide variety of coals at high ratings. It produces rapid ignition of the fuel and high furnace temperature. It prevents infiltration of the air through the bottom and requires less excess air. The removal and handling of the slag is facilitated over other types of systems and is less expensive. Likewise, the building volume of the furnace is reduced and the construction is such that interruptions to service will be at a minimum.

Changes may be made in the furnace and boiler, and other parts of the apparatus, without departing from my invention which resides in the method of operating a furnace.

I claim—

1. The method of operating a finely divided fuel furnace having a heat resistant floor for supporting a slag pool, which comprises admitting to the furnace elements of combustion including slag forming fuel; effecting combustion of said elements while in suspension to produce and maintain molten slag in the furnace; accumulating the molten slag on the floor in a pool of substantial area so as to protect the floor from the radiant heat of combustion; fluid cooling the floor structure and at least those portions of the side walls which form the boundary of the pool to a degree sufficient to protect the floor and walls, but insufficient to prevent the formation and maintenance of the molten pool of slag on the floor; and tapping off the molten slag.

2. The method of operating a finely divided fuel furnace having a heat resistant floor for supporting a slag pool, which comprises admitting to the furnace elements of combustion including slag forming fuel; effecting combustion of said elements while in suspension to produce and maintain molten slag in the furnace; accumulating the molten slag on the floor in a pool of substantial area so as to protect the floor from the radiant heat of combustion; fluid cooling the floor structure and at least those portions of the side walls which form the boundary of the pool to a degree sufficient to protect the floor and walls, but insufficient to prevent the formation and maintenance of the molten pool of slag on the floor; and intermittently tapping off the molten slag.

3. The method of operating a finely divided fuel furnace having a heat resistant floor for supporting a slag pool, which comprises admitting to the furnace elements of combustion including slag-forming fuel; effecting combustion of said elements while in suspension to produce and maintain molten slag in the furnace; accumulating the molten slag on the floor in a pool covering a substantial portion of the area of the floor and with the outer boundary of the pool having substantially the same relation to the furnace walls at all points; fluid cooling the floor and the furnace side walls adjacent the outer boundary of the pool to a degree sufficient to protect the floor and the walls but insufficient to prevent the formation and maintenance of the molten pool of slag; and tapping off the molten slag.

4. The method of operating a finely divided fuel furnace having a heat resistant floor for supporting a slag pool, which comprises admitting to the furnace elements of combustion including slag forming fuel; effecting combustion of said elements while in suspension to produce and maintain molten slag in the furnace; accumulating the molten slag on the floor in a pool of substantial area so as to protect the floor from the radiant heat of combustion; projecting the flame of combustion near enough to the pool to maintain it molten; fluid cooling the floor structure and at least those portions of the side walls which form the boundary of the pool to a degree sufficient to protect the floor and walls, but insufficient to prevent the formation and maintenance of the molten pool of slag on the floor; and tapping off the molten slag.

5. A method of operating a finely divided fuel furnace having a heat resistant floor for supporting a slag pool, which comprises admitting to the furnace elements of combustion, including slag forming fuel; effecting combustion of said elements while in suspension to produce and maintain molten slag in the furnace; accumulating the molten slag on the floor in a pool of substantial area so as to protect the floor from the radiant heat of combustion; fluid cooling the floor structure and liquid cooling at least those portions of the side walls which form the boundary of the pool to a degree sufficient to protect the floor and walls, but insufficient to prevent the formation and maintenance of the molten pool of slag on the floor; and tapping off the molten slag.

ERVIN G. BAILEY.